(12) United States Patent
Boily et al.

(10) Patent No.: US 8,968,449 B2
(45) Date of Patent: Mar. 3, 2015

(54) SPOUT, SYSTEM, AND METHOD FOR PRODUCING A FOAM

(71) Applicant: VKI Technologies Inc., St. Hubert (CA)

(72) Inventors: Alain Boily, Carignan (CA); Jorge Barbales, Brossard (CA); Marc St. Germain, Boucherville (CA); Marc-Andre Vaillant, LaSalle (CA)

(73) Assignee: VKI Technologies Inc., St. Hubert (CA)

( * ) Notice: Subject to any disclaimer, the term of this patent is extended or adjusted under 35 U.S.C. 154(b) by 0 days.

(21) Appl. No.: 13/828,465

(22) Filed: Mar. 14, 2013

(65) Prior Publication Data

US 2014/0010936 A1 Jan. 9, 2014

Related U.S. Application Data

(60) Provisional application No. 61/667,992, filed on Jul. 4, 2012.

(51) Int. Cl.
*B01D 19/00* (2006.01)
*A47J 31/44* (2006.01)
*B01F 5/06* (2006.01)
*B01F 13/10* (2006.01)

(52) U.S. Cl.
CPC ............ *A47J 31/4485* (2013.01); *B01F 5/0688* (2013.01); *B01F 5/0693* (2013.01); *B01F 13/1013* (2013.01)
USPC .................................. 96/204; 96/207; 96/215

(58) Field of Classification Search
CPC ............... B01D 19/00; B01D 19/0042; B01D 19/0047; B01F 3/04446
USPC .............. 95/156, 185, 243, 260, 262; 96/204, 96/206, 207, 215; 261/76, DIG. 26; 426/474
See application file for complete search history.

(56) References Cited

U.S. PATENT DOCUMENTS 5,356,565 A * 10/1994 Southwell ...................... 516/10

FOREIGN PATENT DOCUMENTS

| CN | 201658242 U | 12/2010 |
| DE | 102008058934 A1 | 5/2010 |
| EP | 2572795 A1 | 3/2013 |

OTHER PUBLICATIONS

International Search Report from corresponding PCT Application No. PCT/CA2013/050516 dated Sep. 24, 2013.

* cited by examiner

*Primary Examiner* — Robert A Hopkins
(74) *Attorney, Agent, or Firm* — Wolf, Greenfield & Sacks, P.C.; Robert E. Hunt

(57) ABSTRACT

A spout, system, and method for producing a foam from a pressurized mixture of a liquid containing gas bubbles, e.g., air bubbles. The spout consists of a spout enclosure defining the body of the spout, and which receives the pressurized mixture and conveys the foam out of the spout enclosure. The spout enclosure houses a plurality of screens disposed in series that successively screen the pressurized mixture. Each screen is separated from a consecutive screen by a screen spacing. The screening of the pressurized mixture progressively transforms the gas bubbles in the liquid into foam bubbles of a smaller and generally uniform size. The system uses a manifold having a plurality of intakes which introduce under pressure into a chamber gas, and a solute, solvent or liquid, thereby generating the pressurized mixture containing gas bubbles. This mixture is conveyed out of the chamber via an outtake to the spout enclosure.

29 Claims, 4 Drawing Sheets

SPOUT, SYSTEM, AND METHOD FOR PRODUCING A FOAM

RELATED APPLICATION

This application claims the benefit of U.S. Provisional Application No. 61/667,992, filed on Jul. 4, 2012 and entitled "Spout, System, and Method for Producing a Foam". This provisional patent application is incorporated herein by reference in its entirety.

FIELD OF THE INVENTION

The present invention relates to a device, system, and method for producing a foam for use in the beverage-making industry, for example. More particularly, in one preferred use, the present invention relates to a spout, system and method for mechanically producing a "microfoam" from various types of liquid/air mixtures.

BACKGROUND OF THE INVENTION

Microfoams are known in the art. The term "microfoam" is generally understood to mean a mass of small bubbles. Foam substances characterized as "microfoam" generally have smaller bubbles than those of a regular foam, which gives the microfoam a liquid-like consistency.

Microfoams are desirable in the beverage industry. Most of these beverage microfoams are usually produced by "frothing" the liquid with steam.

In the specific field of preparing coffee beverages, creamier and shinier microfoams, made of milk, cream, chocolate, or any other ingredient, are very much in demand. The connoisseur appreciates, and often demands, the smooth, velvety taste of a microfoam-like substance, which sits afloat their beverage and is an enjoyable aspect of their coffee-drinking experience. Such microfoams can be made manually by a barista, who is generally an expert in the foaming art, and who can create homogeneously creamy and tasty foams that mix with the coffee, thereby making a latte, for example. This microfoam can also be manipulated to make "latte art" (i.e. designs out of the microfoam). The consistency of the microfoam to be produced this way can often vary. For example, for a classic "dry" cappuccino, the foam should be light and floats on top of the more dense espresso. The latte, however, requires a heavier "wetter" foam, that can mix with the coffee.

It is known that foam is created when stem is introduced into a solution, such as milk. Milk can be foamed because of its low surface tension. Proteins in the milk, such as casein and whey, help in the creation of foam because they attract and hold air from the steam, the air acting as an emulsifier. The air-to-milk ratio is a parameter which may determine foam density and viscosity and which may affect the ability to create several types of specialty coffee beverages. It is also known that the size of the bubbles in the foam affect its texture, sometimes referred to in the field as its "feel" or "creaminess". The smaller that the bubbles can be made in the foam, the more creaminess the foam will have for the consumer of the beverage.

Although a microfoam can be made in a variety of ways, the highest quality microfoams are currently achieved manually, whereby a barista or other operator uses a steam wand in conjunction with a professional espresso machine. However, this technique of producing a microfoam is barista-dependent, and the quality of the microfoam can change with the barista. Another disadvantage of such a system is that the creation of a steamed microfoam involves designing a complex and expensive water system, which must comply with numerous consumer safety standards.

It is also desired to use microfoams in colder speciality beverages as well, the most common of these being iced cappuccino and iced lattes. Typically, the microfoam created for these types of beverages is made from cold milk at around 4° C. Steam wands are not suitable for creating cold microfoams. Furthermore, it is often time-consuming and not commercially feasible to make fresh cold microfoams on demand, especially in the busy environment of a modern-day coffee shop.

An additional disadvantage of known techniques for making microfoams is that they work relatively well with microfoams made from homogenous liquids such as milk and cream, for example, but do not lend themselves to easily making microfoams from different, non-homogenous liquids such as the liquid obtained by insufficiently pre-mixing water with one or more condensed solutes, such as condensed milk.

There remains a need for devices and/or methods for producing a foam having the consistency generally associated with a microfoam, which by virtue of their components, steps, and design, satisfy some of the above-mentioned needs and are thus an improvement over other related devices and/or methods known in the art.

SUMMARY OF THE INVENTION

According to an aspect of the present invention, there is provided a spout for producing a foam from a pressurized mixture comprising a liquid containing gas bubbles, the spout comprising:

a spout enclosure having an inlet receiving the pressurized mixture and an outlet conveying the foam out of the spout enclosure; and a plurality of screens disposed in series within the spout enclosure for successively screening the pressurized mixture, each screen having a plurality of holes therein and consecutive screens of said series having a screen spacing therebetween, the successive screening of the pressurized mixture progressively transforming the gas bubbles therein into foam bubbles of a smaller and generally uniform size, thereby producing the foam.

According to another aspect of the present invention, there is provided a system for producing a foam, the system comprising:

a manifold comprising a chamber having a plurality of intakes, each intake introducing under pressure into the chamber gas, and at least one of a solute, a solvent and a liquid, thereby generating a pressurized mixture containing gas bubbles, the chamber also having at least one outtake conveying the pressurized mixture out of the manifold; and a spout for producing a foam from the pressurized mixture, the spout comprising:
  a spout enclosure having an inlet receiving the pressurized mixture from the at least one outtake of the manifold via a mixture conduit, and an outlet conveying the foam out of the spout enclosure; and
  at least one screen within the spout enclosure for screening the pressurized mixture, the at least one screen having a plurality of holes therein, the screening of the pressurized mixture transforming the gas bubbles therein into foam bubbles of a smaller and generally uniform size, thereby producing the foam.

According to yet another aspect of the present invention, there is provided a method of producing a foam from a pressurized mixture comprising a liquid containing gas bubbles by using a spout, the spout comprising a spout enclosure and a plurality of screens disposed in series within the spout enclosure, consecutive screens of said series having a screen spacing therebetween, the method comprising the steps of:

a) introducing the pressurized mixture into the spout enclosure; and b) passing the pressurized mixture successively through the plurality of screens, the successive screening of the pressurized mixture progressively transforming the gas bubbles therein into foam bubbles of a smaller and generally uniform size, thereby producing the foam.

According to one embodiment, the pressurized mixture is allowed to settle in a transitional volume before being passed through the screens. The transitional volume is located between the inlet and the plurality of screens, and receives the pressurized mixture from the inlet and conveys the pressurized mixture out through an output region.

In another embodiment, the transitional volume is fed by a mixing chamber. The mixing chamber receives the pressurized mixture from the inlet and conveys the pressurized mixture to the input of the transitional volume. A turbulence mechanism agitates or mixes the pressurized mixture within the mixing chamber, thereby ensuring a proper mixing of both homogenous and non-homogenous liquids in the pressurized mixture before the bubbles are screened by the plurality of screens.

Preferably, there are between two and eight screens to screen the bubbles in the pressurized mixture to the desired size. The screen size and open area of each screen can also vary, depending on the particular microfoam desired and the pressurized mixture being used, among other factors. The screen spacing can also affect the microfoam produced.

According to another embodiment, water or a cleaning fluid can be flushed through the system or spout after each use, thereby cleaning them. Similarly, a pressurization unit can be used in combination with the system and spout to introduce either pressurized liquid or air into the system or spout.

According to another aspect of the present invention, there is provided a use of a spout in combination with a beverage-making machine for producing a foam.

The objects, advantages and other features of the present invention will become more apparent upon reading of the following non-restrictive description of preferred embodiments thereof, given for the purpose of exemplification only, with reference to the accompanying drawings.

DETAILED DESCRIPTION OF PREFERRED EMBODIMENTS OF THE INVENTION

In the following description, the same numerical references refer to similar elements. Furthermore, for sake of simplicity and clarity, namely so as to not unduly burden the figures with several reference numbers, not all figures contain references to all the components and features of the present invention and references to some components and features may be found in only one figure, and components and features of the present invention illustrated in other figures can be easily inferred therefrom. The embodiments, geometrical configurations, materials mentioned and/or dimensions shown in the figures are preferred, for exemplification purposes only.

Moreover, although the described embodiments of the present invention relate to the production of a microfoam for beverages, it will be readily understood that other embodiments may be used in different fields and in other applications for the production of a foam or foaming agent, as apparent to a person skilled in the art. For this reason, expressions such as "beverage", "milk", "coffee", etc., as used herein should not be taken as to limit the scope of the present invention to the beverage industry or to beverages themselves, but are given simply by way of example. For example, embodiments of the invention may be used in the food industry to produce whipped cream-like products.

Moreover, in the context of the description, the term "foam" is understood to encompass foams and/or microfoams having bubbles of all sizes and consistencies. Therefore, the expressions "foam" and "microfoam", and any other equivalent expressions known in the art will be used interchangeably.

In addition, although the embodiments of the present invention as illustrated in the accompanying drawings comprise various components and although the described embodiments of the spout, system and method as shown consist of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperations thereinbetween, as well as other suitable geometrical configurations may be used for the spout, system and corresponding parts, according to the present invention, as briefly explained and as can be easily inferred herefrom by a person skilled in the art, without departing from the scope of the invention.

Figure 1A:
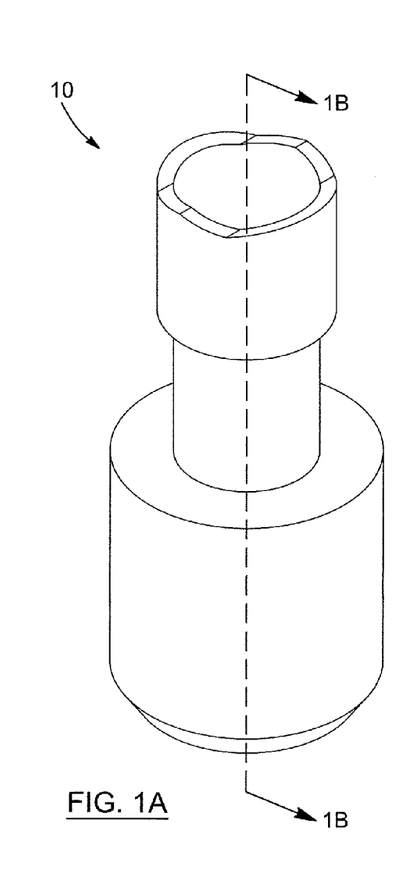
FIG. 1A is a perspective view of a spout for producing a foam, according to a preferred embodiment of the present invention.
Figure 1B:
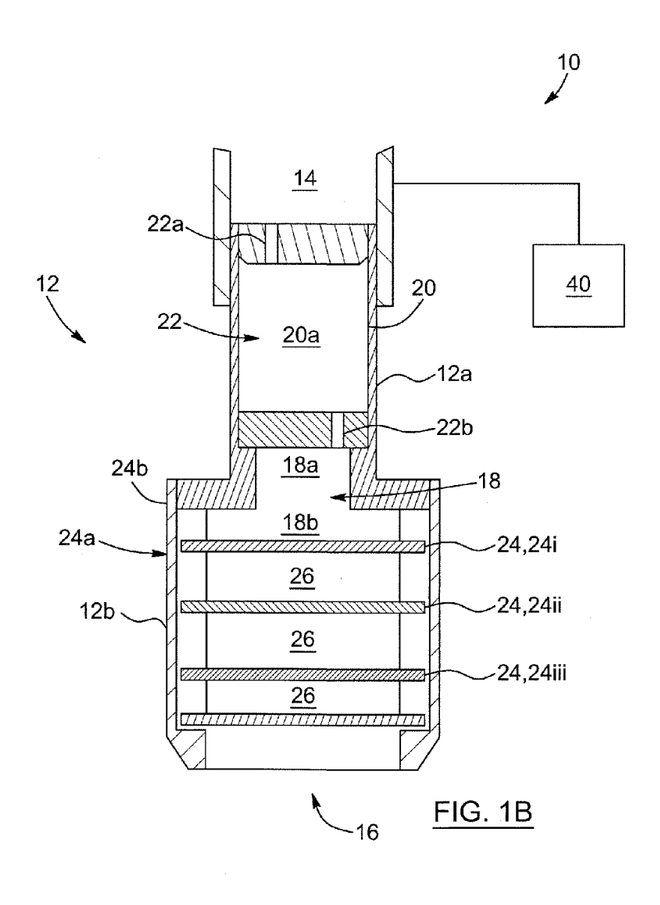
FIG. 1B is a cross-sectional view of an interior of the spout of FIG. 1A taken along the line 1B-1B.

Referring to FIGS. 1A and 1B, there is shown a spout 10 for producing a foam from a pressurized mixture according to one embodiment. It is understood that the spout 10 can be any tube, conduit or other structure through which the pressurized mixture can be conveyed and altered. For this reason, elements such as a "conduit", "tube", "pipe", "chute", "duct", and the like which are capable of the functions ascribed herein are considered as "spouts" as used herein. The spout 10 can be incorporated into a beverage-making machine, such as a coffee machine, or it may be a separate component which is external to any such machine, such as when part of a nozzle which is connected to a machine via a bridging component. One skilled in the art will therefore readily understand that the term "spout" does not necessarily refer to the component ultimately delivering the foam to a cup or the like, but may be a component internal to the beverage-making machine.

The spout 10 produces a foam or microfoam. By "produce", it is understood that by passing the pressurized mixture through the spout 10, the pressurized mixture is altered such that a foam, preferably a microfoam, is generated from this passage of the pressurized mixture. The pressurized mixture consists of a liquid into which a gas is added, thus distributing gas bubbles throughout the liquid. Many different types of gases can be used to produce the microfoam. For example, a carbonated microfoam requires the use of carbon dioxide. However, for the purposes of clarity and succinctness, air will be the gas used to describe the embodiments herein. One skilled in the art will however understand that other embodiments may make the foam using a different gas without departing from the scope of the present invention. The term "mixture" means that the liquid and air are already somewhat mixed together, but may require additional agitation if certain liquids are used. The term "pressurized" can mean that the pressurized mixture of liquid/air bubbles travels through the spout 10 under a certain pressure, that is to say, under a force that is greater than the force resulting from gravity.

The liquids to which air is added, thus producing the pressurized mixture, can be broadly classified into two categories: homogenous and non-homogenous. Homogenous liquids can be those liquids which have a relatively uniform consistency. Prior to being transformed into a microfoam via the spout 10, homogenous liquids often only require that air be added to them. Some homogenous liquids include: partly skimmed milk, skim milk, UHT milk, chocolate milk, buttermilk, powdered milk (when sufficiently pre-mixed with water before being used according to the invention), chocolate and other types of sugar-based beverages, and artificial and natural flavour beverages. The term "non-homogenous" can refer to those liquids which do not have a relatively uniform consistency. Typically, these liquids are solutions consisting of a condensed solute being dissolved in water, which acts as a solvent. When air is added to these non-homogenous liquids, thus generating a pressurized mixture, this pressurized mixture may still require further mixing/agitation before it can be transformed into a microfoam. Examples of condensed solutes which can be used to produce these non-homogenous liquids include: evaporated milk, condensed milk, chocolate and other types of sugar-based syrups, and artificial and natural flavours.

Referring more particularly to FIG. 1B, the spout 10 according to the illustrated embodiment includes a spout enclosure 12 which has an inlet 14 and an outlet 16. The spout enclosure 12 gives structural support to the spout 10 and defines a fluid passage through which the pressurized mixture can travel. In the illustrated embodiment, the spout enclosure 12 is generally cylindrical in shape, and thus resembles a tube. The shape of the spout enclosure 12 can vary. FIG. 1B illustrates one such a varied shaped of the spout enclosure 12, where the spout enclosure 12 is exemplified as consisting of a narrower upper portion 12a joined with a wider lower portion 12b. In its cylindrical embodiment, the spout enclosure 12 may have a diameter which can vary depending on the size of the spout enclosure 12 that is needed for a particular application. One exemplary range of diameter values for the spout enclosure 12 is about 0.375 inches to about 1 inch.

The inlet 14 of the spout enclosure 12 receives the pressurized mixture from upstream of the spout 10. Preferably, the inlet 14 receives the pressurized mixture from a manifold. The inlet 14 can be a volume, a void or a conduit, for example. In another embodiment, the inlet 14 can be connected to a bespoke physical component such as a tube or a housing, which can be distinct from or integral to the spout enclosure 12, and which convey the pressurized mixture from upstream of the spout 10 to the inlet 14. This space and/or component receives the pressurized mixture so as to preferably convey it downstream within the spout enclosure 12. The outlet 16 conveys the microfoam (in contrast to the pressurized mixture) out of the spout enclosure 12 because the pressurized mixture has been converted into foam upstream of the outlet 16. As with the inlet 14, the outlet 16 can be a void and it can be connected to a separate physical component. In the illustrated embodiment shown in FIG. 1B, the outlet 16 is such a void, which can convey the microfoam out of the spout enclosure 12 to an outlet module for preparing the microfoam for delivery to a user's cup, or directly to the cup itself.

Still referring to FIG. 1B, the spout 10 also includes a plurality of screens 24. The purpose of the screens 24 is to reduce the size of the air bubbles in the pressurized mixture, as explained below. In some instances, the screens 24 may provide additional agitation or "frothing" to the pressurized mixture. The term "screen" as used herein refers to any perforated interface such as a surface, meshed wire, or cloth, which is mounted to a support. The screen can be used to separate large objects (i.e. large air bubbles) from smaller objects (i.e. smaller air bubbles), while allowing only these smaller objects to pass through the interface. Therefore, it is understood that each screen can be embodied by one of the devices known in the art such as a mesh, sieve, filter, or the like. The screens 24 are arranged in series or sequentially, which means that the outflow of the pressurized mixture from one screen 24 passes directly to the inflow of the subsequent or successive screen 24 downstream. Each screen 24 includes a plurality of holes, the disposition of which is referred to in the art as the screen's 24 "size" and its "open area". Preferably, each screen 24 is made from a suitable material, such as stainless steel, aluminum, polyester, nylon, paper, cloth or the like, or a combination thereof. The screens 24 are separated from each other by a space designated herein as the screen spacing 26. The microfoam is produced by successively screening the pressurized mixture, which through the interaction of screens 24, screen sizes and open areas, and screen spacing 26, transforms the air bubbles in the pressurized mixture into foam bubbles which are smaller and generally more uniform in size than the air bubbles of the unscreened pressurized mixture.

In one embodiment of the invention, the screens 24 may be provided as part of a removable screen assembly 24a. The screen assembly 24a may for example include multiple screens 24 housed within a cartridge 24b. The cartridge 24b can be removed from the spout 10 for repair or replacement after a certain number of cycles, for example. In one embodiment, the screen assembly 24a can be joined to, and removed from, the spout enclosure 12 just upstream of the outlet 16.

A number of factors relating to the plurality of screens 24 can affect the microfoam produced. Some of these factors, such as the number of screens 24, the screen size and open area of the screens 24, and the screen spacing 26, are now discussed separately.

When the pressurized mixture passes through a given screen 24, the bubbles may be divided into smaller bubbles, thus creating an agglomeration of microbubbles. Alternatively or additionally, since the bubbles are highly compressible, they may be compressed as pressure forces them through the holes of the screen 24. Having more screens 24 can facilitate the transformation of bubbles into microbubbles, thus obtaining an improved microfoam. Preferably, the plurality of screens 24 may consist of between two and eight screens 24, although a greater number of screens 24 may also be used depending on the overall requirements. In one exemplary embodiment, a minimum of two screens 24 may be used thereby ensuring that a modicum of successive or "in series" screening occurs. It is believed that with each screen 24 added, the pressure required to force the pressurized mixture through the screens 24 increases, and the greater number of screens 24 may potentially lead to them becoming clogged. On the other hand, the greater the number of screens 24 used, the more refined (i.e. smaller and more uniformly distributed)

the bubbles of the microfoam may become. Therefore, a balance should be struck, depending on the requirements of a particular application.

In one example of possible screen 24 variations for a given spout 10, it is believed that for some embodiments, having three screens 24 could reduce the pressure needs, clogging potential, and also facilitate cleaning of the spout 10, but may result in less refined microfoams. By contrast, a spout 10 equipped with six screens 24 may produce a relatively refined microfoam, but may have attendant clogging and cleaning issues. The final number of screens 24 can depend on the desired output for a given application or user. Furthermore, the number of screens 24 may not solely depend on issues of refinement, clogging, and cleaning, but may also depend on other factors such as, but not limited to, screen spacing 26, screen sizes and open areas, pumping capabilities, cleaning capabilities, liquid used, and the like. Therefore, the final determination of an optimal number of screens 24 for a given embodiment may require considering and integrating one or more of these factors.

The disposition of the holes of the screens 24 can also affect the microfoam produced. In some embodiments, two parameters may be chosen to define this disposition of holes in the screens 24: screen size and open area. The parameter "screen size" or "screen hole size" may refer to the diameter of a given hole in the screen 24 (i.e. where the screen 24 has circular holes), or may refer to the length and width of a given hole in the screen 24 (i.e. where the screen 24 has rectangular holes). The parameter "open area" is used in the context of the present disclosure to mean the percentage of the area of the screen 24 that is "open", or through which fluid may pass. The open area is calculated by dividing the total area occupied by the holes in the screen 24 by the total surface area of the screen 24.

The screen size of each screen 24 may vary, and can be measured in microns (μm). For typical embodiments, the screen size can be in the range of about 40 μm to about 300 μm, although screens of a smaller or larger size may be used if appropriate. The open area is typically measured in percentage, and the open area of the screens 24 can vary between about 25% to about 50%. It will be readily understood that this range is given by way of example only and is not considered limitative to the scope of the invention. Typically, a "coarse" screen 24 would have a relatively large screen size and a relatively large open area, such as for example a screen 24 having a 300 μm screen size and an open area of 50%. In contrast, a "fine" screen 24 may be considered to be one that has a relatively small screen size and a relatively small open area, such as for example a screen 24 having a 40 μm screen size and an open area of 25%.

In one embodiment, the screen size and open area of all the screens 24 are the same. In such an embodiment, for example, the screen size and open area of each screen 24 can for example be in the order of about 80 μm×80 μm and about 30%, respectively. Alternatively, and as mentioned previously, the screen size and open area of each screen 24 can vary, and each screen 24 can be larger or more "coarse" than a successive screen 24. In but one example of such an embodiment, and as exemplified in FIG. 1B, consider a spout 10 equipped with three sequential screens 24i,24ii,24iii. The first screen 24i can have a relatively large screen size of about 300 μm and an open area of about 50%. As the pressurized mixture goes through this screen 24i, the screen 24i reduces the size of the bubbles. This can create a dense "cloud" of uniform microbubbles. The second screen 24ii in series and downstream to the first screen 24i can be smaller or "finer", and may have a screen size of about 200 μm and an open area of about 30%. The second screen 24ii screens the bubbles of the pressurized mixture in the same way as the first screen 24i, thus producing even smaller bubbles than were produced by the first screen 24i. The third screen 24iii is successive to the second screen 24ii, and can be even finer than the second screen 24ii. The third screen 24iii can have a screen size of about 40 μm and an open area of about 25%. The third screen 24iii screens the bubbles in the same way as the first and second screens 24i,24ii. This general example illustrates how the microfoam may be produced as the pressurized mixture passes through the plurality of screens 24 arranged in series, each screen 24 reducing the size of the bubbles that pass through it until an acceptable bubble size is reached for the microfoam.

In an alternative embodiment, the screen size of a given "mesh-type" screen 24 can vary throughout the mesh of the screen 24. Each of these differently sized mesh areas can be referred to as "mesh regions". Each mesh region, or at least one of them, can have a unique screen size and/or open area which differs from the screen size/open area of an adjacent mesh region. In an example of such a mesh of a screen 24, consider a circular screen 24. A first mesh region m1 can be defined by a circular band extending from the center of the mesh to a given radius, r1. The screen size and open area of mesh region m1 can be for example about 40 μm and 25%, respectively. An adjacent second mesh region m2 is another circular band extending from radius r1 to another radius r2.

The screen size and open area of mesh region m2 can be for example about 200 μm and 40%, respectively. A third and final mesh region m3 is adjacent to mesh region m2, and is yet another circular band extending from radius r2 to an outer radius of the mesh r3. The screen size and open area of mesh region m3 can be for example about 300 μm and about 50%, respectively. Each mesh region going from m1 to m3 is progressively coarser. Thus, the plurality of mesh regions m1,m2,m3 may encourage an even distribution of bubbles across a given screen, which can improve the screening process. A subsequent screen 24 can have a similar distribution of mesh regions as described for m1, m2, and m3, but with screen sizes and open areas that are respectively finer than for mesh regions m1,m2,m3.

Finally, the screen spacing 26 can also affect the microfoam produced by aiding in the distribution of bubbles and of pressurized mixture, thereby helping to produce a more uniform microfoam. The screen spacing 26 can be any space, volume, or void between consecutive screens 24. It is believed that if the screen spacing 26 is too small (i.e. the screens 24 are too close together), the quality of the microfoam produced may not be sufficient for many applications because the series of screens 24 essentially act as a single screen 24, loosing the beneficial effects of a succession of screens. Conversely, if the screen spacing 26 is too large (i.e. the screens 24 are too far apart), the agitation of the pressurized mixture within the screen spacing 26 may decrease, allowing the bubbles to remerge and grow in size, thus rendering the previous screening useless. Thus, as with the number of screens 24 used, a balance is preferably struck with screen spacing 26. An exemplary range of screen spacing 26 values that may be used includes about a few thousandths of an inch to about 250 thousandths of an inch. In one exemplary embodiment, the screen spacing 26 between consecutive screens 24 can be about 60 thousandths of an inch.

Still referring to FIG. 1B, according to an embodiment, the spout enclosure 12 further includes a transitional volume 18 between the inlet 14 and the screens 24. The transitional volume 18 is understood to be any space, void, cavity, and the like defined by any suitable structure (i.e. walls of the spout enclosure 12, separate physical component, etc.) which advantageously allows the pressurized mixture to settle and/or accumulate before being screened by the screens 24. In one optional embodiment, the transitional volume 18 is similar in size and dimension to the screen spacing 26. The transitional volume 18 can be cylindrical in shape, and has an input region 18a where the pressurized mixture is received from the inlet 14. The transitional volume 18 also includes an output region 18b where the pressurized mixture is conveyed to the screens 24 downstream. In the illustrated preferred embodiment of FIG. 1B, the input region 18a is shown being narrower than the output region 18b, although the input region 18a may also be the same size or larger than the output region 18b.

In one embodiment, the spout enclosure 12 further includes a mixing chamber 20. The mixing chamber 20 is preferably cylindrical in shape, and allows for the agitation of the pressurized mixture passing therethrough. The mixing of pressurized mixture can be useful for pressurized mixtures made up of non-homogenous liquids. These non-homogenous liquids may require an additional mixing so as to create a pressurized mixture that is more uniformly mixed before being passed through the plurality of screens 24 so as to create the microfoam. For relatively homogenous liquids, a mixing chamber 20 can be used but is not usually necessary. It is understood that the mixing chamber 20 is not necessarily a physically distinct chamber or housing; as with the inlet 14, outlet 16, and transitional volume 18, the mixing chamber can also consist of a void or space defined by the walls of the spout enclosure 12. In all the various bodies through which the pressurized mixture passes (i.e. the inlet 14, the transitional volume 18, the mixing chamber 20, etc.) turbulence may be generated and maintained, thereby ensuring that the pressurized mixture is properly mixed, or "homogenous", before passing through the screens 24.

As shown in FIG. 1B, the mixing chamber 20 is preferably positioned between the inlet 14 and the transitional volume 18. It receives the pressurized mixture from the inlet 14 and conveys the further agitated or mixed pressurized mixture to the input region 18a. Between the period at which the pressurized mixture is received from the inlet 14 and conveyed to the input region 18a, an agitation or mixing occurs. Preferably, this is accomplished by a turbulence mechanism 22, which imparts turbulence and/or agitation to the pressurized mixture. The turbulence mechanism 22 can be housed within the mixing chamber 20. Alternatively, the turbulence mechanism 22 can be an exterior component or stand-alone part that is functionally connected to the mixing chamber 20. The turbulence mechanism 22 also may allow for the maintenance of a desired liquid-to-air ratio.

In a preferred embodiment, the turbulence mechanism 22 includes an inlet port 22a and an outlet port 22b of the mixing chamber 20. The inlet port 22a is positioned between the inlet 14 and the mixing chamber 20 (or the space 20a defined thereby). The inlet port 22a can be any aperture, hole, channel, or similar passage which allows for the constricted passage of the pressurized mixture from the inlet 14 to the mixing chamber 20. The inlet port 22a is substantially narrower than both the inlet 14 and the space 20a. The expression "substantially narrower" is understood to mean that the dimensions (i.e. width, circumference, diameter, cross-sectional area, etc.) of the inlet port 22a are significantly less than the dimensions of the inlet 14 and of the space 20a. Put differently, and from the view of the pressurized mixture travelling through the spout 10, the pressurized mixture would first pass through the inlet 14 and then be confined to a much narrower volume as it passed through the inlet port 22a, before finally exiting into the much larger space 20a. The inlet port 22a therefore restricts the flow of the pressurized mixture from the inlet 14 to mixing chamber 20, thereby increasing the pressure of the pressurized mixture entering the space 20a.

The outlet port 22b is preferably similar to the inlet port 22a. The outlet port 22b is positioned between mixing chamber 20 and the input region 18a. As with the inlet port 22a, the outlet port 22b is also substantially narrower than both the space 20a and the input region 18a. Therefore, the outlet port 22b can also increase the pressure of the pressurized mixture. Preferably, in restricting the flow of the pressurized mixture out of the mixing chamber 20, the outlet port 22b also allows pressure to build up inside the mixing chamber 20. Therefore, in such an embodiment, pressure inside the mixing chamber 20 can be increased in two ways: first, by augmenting the pressure of the pressurized mixture entering from the inlet port 22a, and second, by having the outlet port 22b restrict the flow of the pressurized mixture out of the mixing chamber 20. This increase in pressure caused by the inlet and outlet ports 22a, 22b can significantly increase the turbulence in the mixing chamber, thereby agitating the pressurized mixture and causing further mixing. Of course, a skilled person would understand that the inlet and outlet ports 22a, 22b are merely preferred configurations, and that any other technique, mechanism, or device to increase turbulence within the mixing chamber 20 is within the scope of the present invention. As but one example of such an alternate configuration, baffles positioned appropriately within the mixing chamber 20 can also contribute turbulence to the mixing chamber.

According to another aspect of the invention, and referring to FIG. 1B, there is provided a use of the spout 10 in combination with a beverage-making machine 40 to produce a foam, such as a microfoam. The beverage-making machine 40 can be a coffee machine, a hot chocolate machine, an espresso maker, or other machine capable of making a hot or cold beverage. It is understood that the expression "in combination" as used to describe the relationship of the spout 10 with the beverage-making machine 40 can mean that the spout 10 can be exterior to the beverage-making machine 40 or a stand-alone component, and functionally connected thereto. Alternatively, the spout 10 can be incorporated into the beverage-making machine 40. The positioning and placement of the spout 10 in relation to the beverage-making machine 40 can depend upon many factors such as, but not limited to, aesthetic appearance, machine space constraints, spout 10 requirements, and other like factors.

Figure 4:
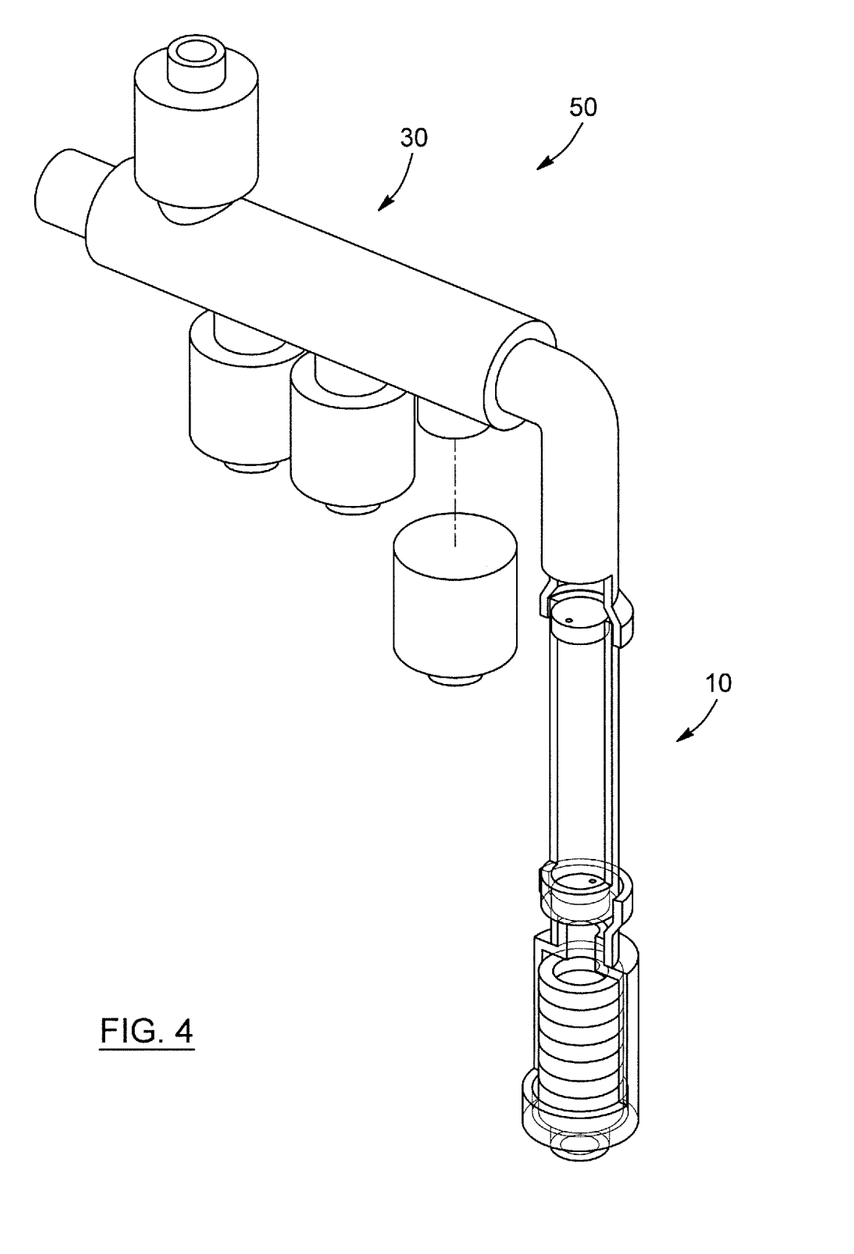
FIG. 4 is a perspective view of a system for producing a foam, according to another embodiment of the present invention.

According to yet another aspect of the invention, there is provided a system for producing a foam. FIG. 4 exemplifies an embodiment of the system 50, which includes a manifold 30, and a spout 10 such as the one described above.

Figure 2:
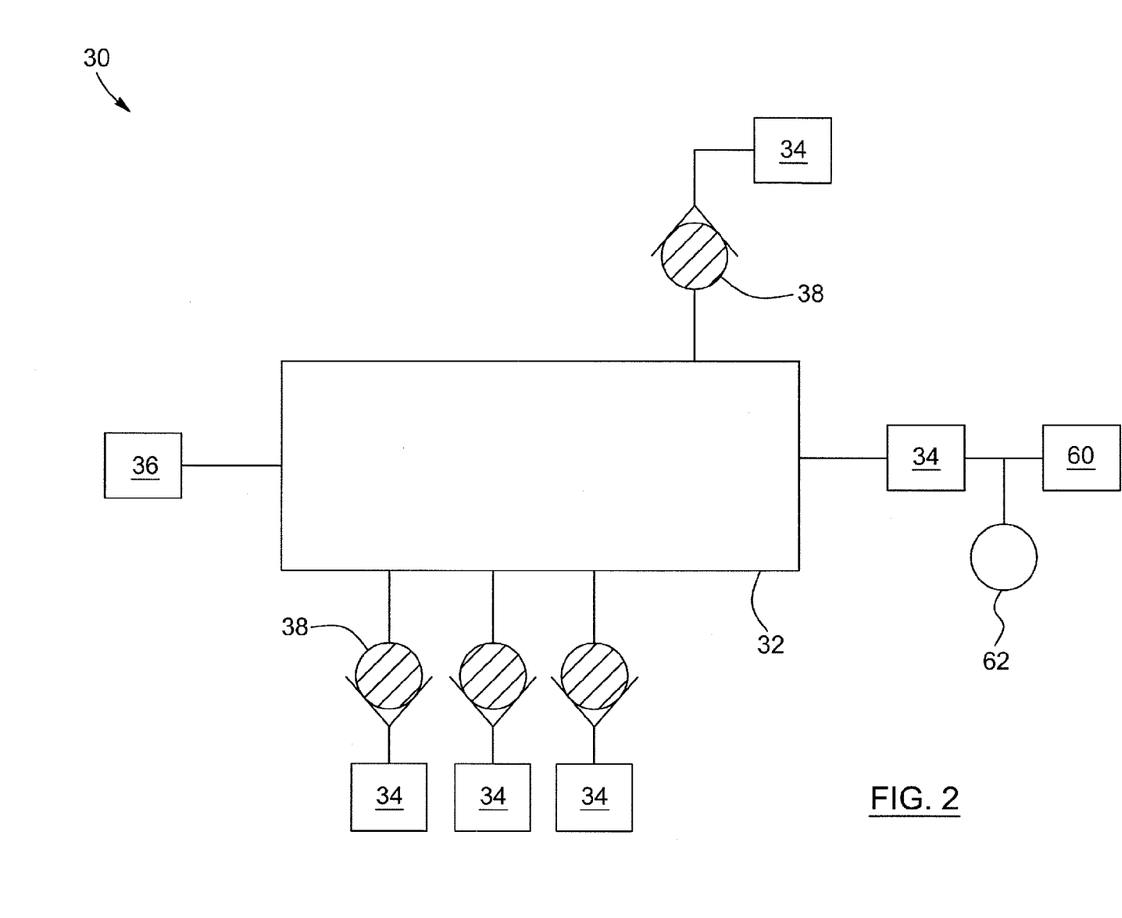
FIG. 2 is a schematic view of a manifold of a system for producing a foam, according to another embodiment of the present invention.

Referring now to FIG. 2, the manifold 30 can be any chamber, conduit, receptacle, storage area, or other container which can receive multiple inputs and mix the elements thereby received, and which can then convey these mixed elements downstream of the manifold 30 via at least one outlet. The manifold 30 according to an embodiment of the invention includes a chamber 32 which can receive and mix the elements received therein. The chamber 32 has a plurality of intakes 34 which introduce into the chamber 32 pressurized air, and at least one of the following elements: a solute, a solvent or a homogenous liquid. The elements introduced into the chamber mix together under pressure, thereby generating a pressurized mixture. A solute need not be introduced into the chamber 32 at all. For example, the pressurized mixture may be generated from introducing into the chamber 32 only air and a homogenous liquid, such as milk and the like. Alternatively, a solute such as evaporated milk may be dissolved in a solvent such as water to create a non-homogenous liquid. In either embodiment, pressurized air can then be added to create the pressurized mixture. The pressurized mixture is then transferred via the at least one outtake 36 to the inlet of the spout. This transfer may occur through the use of a bridging component, such as a mixture conduit, which links the outtake 36 of the manifold 30 with the inlet of the spout. Examples of such a mixture conduit include a plastic tube or hose.

The spout of the system may be similar to embodiments of a spout described above. In some embodiments, however, the spout of the system may include only one screen to transform the air bubbles of the pressurized mixture into foam bubbles of a smaller and more uniform size. This configuration may be useful where less consistent foam is required and may reduce any related clogging and system pressure issues.

Valves 38 can be used in combination with the intakes 34. These valves 38 may be check valves, one-way valves, or non-return valves for introducing into the chamber 32 the elements from the intakes 34 and for preventing their return. These valves 38 may also be control valves for controlling the flow of the elements into the chamber 32 and/or out of the outtake 36. Alternatively, the flow control of elements into the chamber 32 can be achieved with dedicated feeder systems or pumps, which when operated in conjunction with monitoring software and appropriate sensors, can control the exact amount of the elements introduced into the chamber 32, thereby helping to control and maintain a liquid-to-air ratio.

Advantageously, in embodiments of the system 32, since the precise amount of air, a particular solvent, a particular solute or a particular homogeneous liquid through the intakes 34 can be controlled, it is possible to establish and maintain a liquid-to-air ratio (LAR) or a liquid-to-gas ratio (LGR) of the pressurized mixture. The LAR is a variable which can affect the quality of the microfoam produced. Other input variables can also affect the microfoam produced, examples of which include liquid and air temperature, liquid and air flow, stream velocity, and stream pulse. Thus, the manifold 30 can unite a precise dosage of air, solid ingredients, and liquids to create the pressurized mixture.

In one embodiment, the system can be cleaned after each use, after a predetermined number of uses, and/or in response to a user's input. The cleaning may be performed by flushing water or another cleaning fluid through the manifold 30 and then on through the spout and its outlet. Optionally, air can then be flushed through the same components to dry them out. The water and air for flushing may be obtained from the plurality of the intakes 34 of the manifold 30 which introduce these elements. Alternatively, the water or cleaning fluid may be coupled to an external component such as a dedicated pump, which pumps the water and/or cleaning fluid through one of the intakes 34 of the manifold 30, and then on through the spout and out its outlet. Another one of the external components can be a pressurization unit 60. The pressurization unit 60 can include at least one mixture pump 62 which connects to one of the intakes 34 of the manifold 30. The mixture pump 62 can pump a liquid or air into the chamber 32 of the manifold 30, which provides pressure to the pressurized mixture. In alternative embodiments, no mixture pump may be needed to pressurize the gas introduced into the chamber 32. For example, a gas such as carbon dioxide could be created by a chemical reaction between two substances which is then introduced into the system. Pressurized air may also be introduced via gas/air canisters, which store gas/air under pressure. All techniques for introducing pressurized gas into the chamber 32 can help to control the LGR.

According to yet another aspect of the invention, there is provided a method for producing a foam for the pressurized mixture. The steps of method will now be described with reference to the accompanying figures.

Figure 3A:
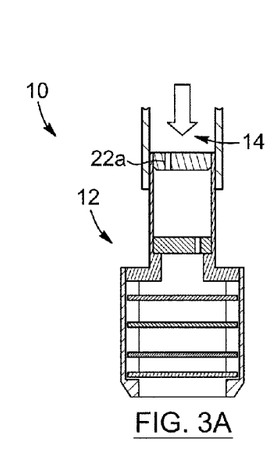
FIGS. 3A to 3H are cross-sectional views of the interior of the spout of FIG. 1B showing the movement of the pressurized mixture and cleaning fluid through said spout.
Figure 3B:
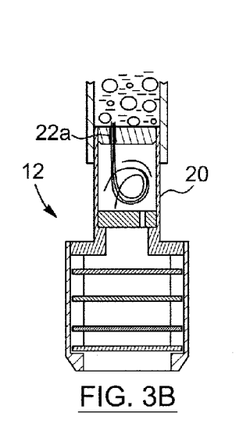

Referring to FIGS. 3A to 3H, the method uses the spout 10. FIGS. 3A and 3B illustrate step a), where the pressurized mixture is introduced into the spout enclosure 12. Preferably, this involves introducing the pressurized mixture first through the inlet 14 and then through the inlet port 22a of the mixing chamber 20, if one is provided. As previously mentioned, the pressure of the pressurized mixture can increase as it goes through the inlet port 22a, thus causing agitation and turbulence in the pressurized mixture within the mixing chamber 20, as exemplified schematically in FIG. 3B.

Figure 3C:
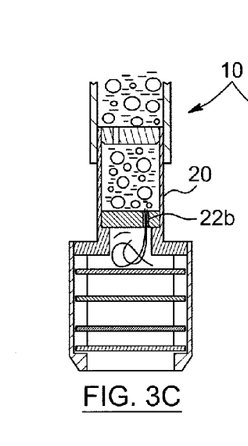
Figure 3D:
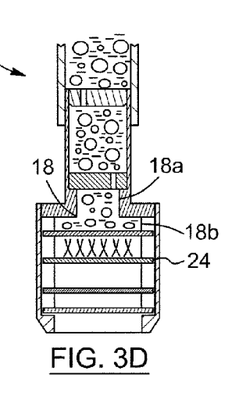

Referring now to FIGS. 3C and 3D, the pressurized mixture preferably continues to flow through the spout 10, through the mixing chamber 20, and out through the outlet port 22b. As it flows through the outlet port 22b, the pressure of the pressurized mixture is increased which can cause further mixing, as exemplified schematically in FIG. 3C. Once out of the outlet port 22b, the pressurized mixture can enter the input and output regions 18a,18b of the transitional volume 18, before entering the plurality of screens 24.

Figure 3E:
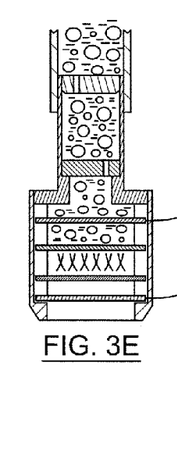
Figure 3F:
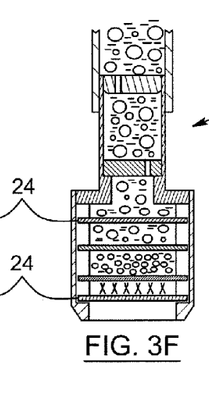
Figure 3G:
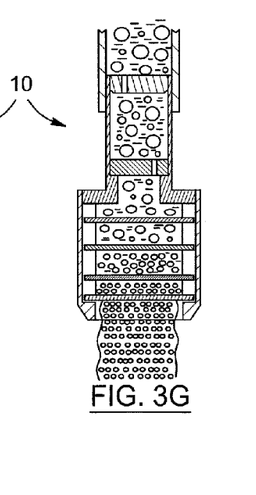

FIGS. 3E to 3G illustrate step b), where the pressurized mixture is passed through a succession of screens 24, which transform the bubbles into bubbles of a smaller size. FIGS. 3E to 3F exemplify the decrease in bubble size of the pressurized mixture as it passes through each screen 24 in series. Finally, the pressurized mixture preferably becomes a microfoam, which exits the spout 10 as shown in FIG. 3G.

Figure 3H:
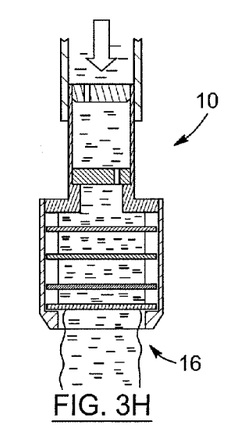

FIG. 3H shows the spout 10 being cleaned by the cleaning fluid. A cleaning fluid such as water can be flushed through the spout 10 and out its outlet 16. A stream of pressurized air can then be flushed through the system/spout 10 after the water, thereby at least partially drying the spout 10.

According to one embodiment, and prior to the steps of the method, the LAR of the pressurized mixture may be controlled and/or determined by the manifold, for example.

Finally, the spout 10, system, and corresponding parts are preferably made of substantially rigid materials, such as metals, alloys, hardened polymers, composite materials, and/or the like, depending on the particular applications for which the invention is intended for, and the different parameters in cause (temperature of fluids, corrosion, screen clogging, dimensions, etc.).

The spout, system, and method for producing a microfoam according to described embodiments represent advantages over other methods and devices known in the art. Advantageously, the spout, system and method can allow for the controlled and automated production of a microfoam in a relatively quick manner, especially when compared to the steam wand technique known in the art. This production can be achieved mechanically and repeatedly by using the basic physics and chemical properties of the fluids and solid ingredients involved. Microfoams of different densities, viscosities, feels, and the like can be readily produced according to the invention by controlling such variables as the LAR, the number of screens, the screen size and open area, and the screen spacing. Furthermore, the production of a microfoam does not involve complex machinery such as the steam wand, which may reduce the need to perform costly testing so as to obtain regulatory approval.

Furthermore, the microfoam can be produced from both cold and hot liquids, with some liquid temperatures being as low as 4° C. Thus, both cold and hot microfoams can be created by the same spout, system, or method, an advantage that is difficultly achieved with known devices, if at all. This advantageously allows for the production of cold specialty coffee beverages such as iced cappuccinos and lattes.

Another advantage provided is that the spout and system can be cleaned and then air-dried, quickly and automatically, thus reducing the intervention required of a human agent.

Furthermore, the mixing chamber further allows non-homogenous liquids to be used in the pressurized mixture, thereby significantly increasing the number and types of microfoams that can be produced. As but one example, chocolate is a basic specialty coffee ingredient utilized in beverages such as the mochaccino and café mocha. Additionally, many operators would like to offer hot cocoa and hot chocolate milk in their range of choices. The presence and use of the mixing chamber allows for the creation of a chocolate-based microfoam, thus inventing new beverages and expanding on the available selection.

Moreover, the use of the spout in combination with the beverage-making machine may allow for the control of the ratio of a microfoam produced to liquid in a cup. As but one example of such control, a drinking cup may be filled entirely with the microfoam, if desired. Alternatively, the machine can produce a cup filled half with a microfoam, and half with a beverage such as coffee, for example. Of course, other ratios and other types of liquids can be produced and used. Thus, hot and cold consumable products which can be used and produced by the spout and machine include, but are not limited to, cappuccino, cocoa, café latte, chocolate milk, chai latte, steamer, café mocha, smoothie, mochaccino, and whip cream.

Of course, numerous modifications could be made to the above-described embodiments without departing from the scope of the invention, as apparent to a person skilled in the art.

The invention claimed is:

1. A spout for producing a foam from a pressurized mixture comprising a liquid containing gas bubbles, the spout comprising:
   a spout enclosure having an inlet receiving the pressurized mixture and an outlet conveying the foam out of the spout enclosure; and
   a plurality of screens disposed in series within the spout enclosure for successively screening the pressurized mixture, each screen having a plurality of holes therein and consecutive screens of said series having a screen spacing therebetween, each screen having a screen hole size in the range of about 40 μm to about 300 μm, the successive screening of the pressurized mixture progressively transforming the gas bubbles therein into foam bubbles of a smaller and generally uniform size, thereby producing the foam.

2. A spout according to claim 1, wherein the spout enclosure comprises a transitional volume disposed between the inlet and the plurality of screens, the transitional volume comprising an input region receiving the pressurized mixture from the inlet, and an output region conveying the pressurized mixture to the plurality of screens.

3. A spout according to claim 2, wherein the spout enclosure comprises:
   a mixing chamber disposed between the inlet and the transitional volume, the mixing chamber receiving the pressurized mixture from the inlet and conveying the pressurized mixture to the input region of the transitional volume; and
   a turbulence mechanism imparting turbulence to the pressurized mixture within said mixing chamber.

4. A spout according to claim 3, wherein the turbulence mechanism comprises an inlet port disposed between the inlet of the spout enclosure and the mixing chamber, the inlet port being substantially narrower than the inlet and the mixing chamber thereby restricting a flow of the pressurized mixture from the inlet to the mixing chamber.

5. A spout according to claim 3, wherein the turbulence mechanism comprises an outlet port disposed between the mixing chamber and the input region of the transitional volume, the outlet port being substantially narrower than the mixing chamber and the input region thereby restricting a flow of the pressurized mixture out of the mixing chamber and into the input region.

6. A spout according to claim 2, wherein the transitional volume and the mixing chamber have a cylindrical shape.

7. A spout according to claim 1, wherein the plurality of screens comprises between two and eight of said screens.

8. A spout according to claim 1, wherein the plurality of screens comprises at least three of said screens.

9. A spout according to claim 7, wherein the plurality of screens comprises six of said screens.

10. A spout according to claim 1, wherein the plurality of screens is housed within a cartridge, the cartridge being removably mountable to the spout enclosure.

11. A spout according to claim 1, wherein each screen comprises an open area in the range of about 25% to about 50%.

12. A spout according to claim 11, wherein the screen size and open area of each screen are substantially identical for all of said screens.

13. A spout according to claim 11, wherein the screen size and open area of at least one of said plurality of screens differ from the screen size and open area of at least another one of said screens.

14. A spout according to claim 13, wherein the screen size and open area of each screen is coarser than the screen size and open area of the successive screen.

15. A spout according to claim 11, wherein each screen comprises a plurality of adjacent mesh regions, each mesh region comprising a screen size and open area, the screen size and open area of at least one of said plurality of mesh regions differing from the screen size and open area of at least one adjacent mesh region.

16. A spout according to claim 1, wherein the screen spacing between consecutive screens is between about a few thousandths of an inch to about 250 thousandths of an inch.

17. A spout according to claim 16, wherein the screen spacing is about 60 thousands of an inch.

18. A spout for producing a foam from a pressurized mixture comprising a liquid containing gas bubbles, the spout comprising:
   a spout enclosure having an inlet receiving the pressurized mixture and an outlet conveying the foam out of the spout enclosure; and
   a plurality of screens comprises between two and eight of said screens disposed in series within the spout enclosure for successively screening the pressurized mixture, each screen having a plurality of holes therein and consecutive screens of said series having a screen spacing therebetween, the successive screening of the pressurized mixture progressively transforming the gas bubbles therein into foam bubbles of a smaller and generally uniform size, thereby producing the foam.

19. A spout according to claim 18, wherein the spout enclosure comprises a transitional volume disposed between the inlet and the plurality of screens, the transitional volume comprising an input region receiving the pressurized mixture from the inlet, and an output region conveying the pressurized mixture to the plurality of screens.

20. A spout according to claim 19, wherein the spout enclosure comprises:

a mixing chamber disposed between the inlet and the transitional volume, the mixing chamber receiving the pressurized mixture from the inlet and conveying the pressurized mixture to the input region of the transitional volume; and a turbulence mechanism imparting turbulence to the pressurized mixture within said mixing chamber.

21. A spout according to claim 19, wherein the transitional volume and the mixing chamber have a cylindrical shape.

22. A spout according to claim 18, wherein the plurality of screens is housed within a cartridge, the cartridge being removably mountable to the spout enclosure.

23. A spout according to claim 18, wherein each screen comprises a screen size and an open area, the screen size being in the range of about 40 µm to about 300 µm, and the open area being in the range of about 25% to about 50%.

24. A spout according to claim 23, wherein the screen size and open area of each screen are substantially identical for all of said screens.

25. A spout according to claim 23, wherein the screen size and open area of at least one of said plurality of screens differ from the screen size and open area of at least another one of said screens.

26. A spout according to claim 23, wherein the screen size and open area of each screen is coarser than the screen size and open area of the successive screen.

27. A spout according to claim 23, wherein each screen comprises a plurality of adjacent mesh regions, each mesh region comprising a screen size and open area, the screen size and open area of at least one of said plurality of mesh regions differing from the screen size and open area of at least one adjacent mesh region.

28. A spout according to claim 18, wherein the screen spacing between consecutive screens is between about a few thousandths of an inch to about 250 thousandths of an inch.

29. A spout according to claim 28, wherein the screen spacing is about 60 thousands of an inch.

* * * * *